US011356837B2

(12) United States Patent
Mbonye et al.

(10) Patent No.: US 11,356,837 B2
(45) Date of Patent: Jun. 7, 2022

(54) STATION AND METHOD FOR LTE ONLY ATTACH OPTIMIZATION

(71) Applicant: APPLE INC., Cupertino, CA (US)

(72) Inventors: Gahima S. Mbonye, San Jose, CA (US); Vijay Venkataraman, San Jose, CA (US); Srinivasan Nimmala, San Jose, CA (US); Thanigaivelu Elangovan, Cupertino, CA (US); Abdul-Munem Ai-Khudairi, Oakville, CA (US); Anish K. Goyal, Milpitas, CA (US); Rafael L. Rivera-Barreto, Santa Clara, CA (US); Yifan Zhu, San Jose, CA (US); Ryan Booth, San Jose, CA (US); Lakshmi Kavuri, Cupertino, CA (US); Venkateswara Rao Manepalli, San Jose, CA (US)

(73) Assignee: Apple Inc., Cupertino, CA (US)

( * ) Notice: Subject to any disclaimer, the term of this patent is extended or adjusted under 35 U.S.C. 154(b) by 143 days.

(21) Appl. No.: 15/592,980

(22) Filed: May 11, 2017

(65) Prior Publication Data

US 2018/0084401 A1  Mar. 22, 2018

Related U.S. Application Data

(60) Provisional application No. 62/398,062, filed on Sep. 22, 2016.

(51) Int. Cl.
*H04W 8/02* (2009.01)
*H04W 48/16* (2009.01)

(52) U.S. Cl.
CPC ............. *H04W 8/02* (2013.01); *H04W 48/16* (2013.01)

(58) Field of Classification Search
CPC .... H04W 8/02; H04W 48/16; H04W 72/0493
See application file for complete search history.

(56) References Cited

U.S. PATENT DOCUMENTS

| | | | |
|---|---|---|---|
| 9,794,416 B1 * | 10/2017 | Oroskar | H04M 7/006 |
| 9,877,224 B2 * | 1/2018 | Mahmood | H04M 3/02 |
| 2013/0044613 A1 * | 2/2013 | Edara | H04W 76/16 370/252 |
| 2013/0136115 A1 * | 5/2013 | Moisanen | H04W 76/18 370/338 |

(Continued)

*Primary Examiner* — Muthuswamy G Manoharan
(74) *Attorney, Agent, or Firm* — Fay Kaplun & Marcin, LLP

(57) ABSTRACT

A method performed by a station that includes receiving information from a cell of a Public Land Mobile Network (PLMN), determining whether the information indicates the cell supports circuit switched fallback (CSFB) voice calls, when the CSFB voice calls are not supported, determining whether at least one packet switched voice property of the station satisfies a predetermined condition and attaching to the cell of the PLMN when the predetermined condition is satisfied. A further method performed by a station connected to a PLMN that includes identifying cells of the PLMN available for the station to camp on, determining whether the station is capable of executing packet switched calls, when the station is not capable of executing packet switched calls, determining whether the identified cells have a neighbor cell that supports CSFB voice calls and prioritizing the cells that are identified as having neighbor cells that support CSFB voice calls.

20 Claims, 5 Drawing Sheets

(56) References Cited

U.S. PATENT DOCUMENTS

| | | | |
|---|---|---|---|
| 2014/0348064 A1* | 11/2014 | Jeong | H04W 48/18 |
| | | | 370/328 |
| 2016/0316411 A1* | 10/2016 | Jung | H04W 4/70 |
| 2016/0337928 A1* | 11/2016 | Yang | H04W 36/30 |
| 2016/0353333 A1* | 12/2016 | Jamadagni | H04W 36/0022 |
| 2017/0201923 A1* | 7/2017 | Yang | H04L 43/16 |
| 2017/0289860 A1* | 10/2017 | Wang | H04W 36/0022 |
| 2017/0311151 A1* | 10/2017 | Ohashi | H04W 8/12 |

* cited by examiner

Fig. 4

System Information Block Data 400

| SIB-1 | Cell access related parameters and scheduling of other SIBs |
|---|---|
| SIB-2 | Common and shared channel configuration, RACH related configuration are present |
| SIB-3 | Parameters required for intra-frequency, inter-frequency and I-RAT cell re-selections |
| SIB-4 | Information regarding INTRA-frequency neighboring cells (E-UTRA) |
| SIB-5 | Information regarding INTER-frequency neighboring cells (E-UTRA) |
| SIB-6 | Information for re-selection to INTER-RAT (UTRAN cells) |
| SIB-7 | Information for re-selection to INTER-RAT (GERAN cells) |
| SIB-8 | Information for re-selection to INTER-RAT (CDMA2000) |
| SIB-9 | Information related to Home eNodeB (FEMTOCELL) |
| SIB-10 | ETWS (Earthquake and Tsunami Warning System) information (Primary notification) |
| SIB-11 | ETWS (Earthquake and Tsunami Warning System) information (Secondary notification) |
| SIB-12 | Commercial Mobile Alert Service (CMAS) information. |
| SIB-13 | Contains the information required to acquire the MBMS control information associated with one or more MBSFN areas. |

STATION AND METHOD FOR LTE ONLY ATTACH OPTIMIZATION

PRIORITY CLAIM/INCORPORATION BY REFERENCE

This application claims priority to U.S. Provisional Application 62/398,062 entitled "Station and Method for LTE Only Attach Optimization," filed on Sep. 22, 2016, the entirety of which is incorporated herein by reference.

BACKGROUND INFORMATION

A station may be configured to communicate wirelessly with a network by associating with a base station of the network. The station may include a network application that is executed to perform this functionality of joining the network and associating with the base station. The network may operate using a predetermined radio access technology (RAT). When more than one network and/or more than one base station is available for association in a given location of the station, the station may connect to any one of these base stations as long as the station is configured to operate on the corresponding RAT.

Many mobile network operators (MNOs) are currently in the process of reducing or terminating investing resources into legacy technologies, such as 2G and 3G, in favor of expanding coverage of LTE cellular technology. Older generation cellular phones, such as those that lack Voice over LTE (VoLTE) capabilities or cellular phones that have the VoLTE capabilities turned off, cannot conduct voice calls on LTE only radio access technologies (RATS) and require legacy circuit switched voice networks to conduct the voice call.

Under the current standards, when the station boots up, it may attach to an LTE only RAT. If the station lacks VoLTE capabilities, the station would determine that the LTE only RAT is not suitable, detach, and reattach to another RAT or network. This process may be repeated until a suitable RAT or network is located. Such a process puts a strain on the station's battery supply, the network's resources, and a station user's time. Accordingly, the following exemplary embodiment provide a solution to avoid the above described attach and check process.

SUMMARY

Described is a method performed by a station. The method includes receiving information from a cell of a Public Land Mobile Network (PLMN), determining whether the information indicates the cell supports circuit switched fallback (CSFB) voice calls, when the CSFB voice calls are not supported, determining whether at least one packet switched voice property of the station satisfies a predetermined condition and attaching to the cell of the PLMN when the at least one packet switched voice property satisfies the predetermined condition.

Also described is a station having a transceiver and a processor configured to execute instructions. The instructions cause the processor to perform operations including receiving information from a cell of a Public Land Mobile Network (PLMN), determining whether the information indicates the cell supports circuit switched fallback (CSFB) voice calls; when the CSFB voice calls are not supported, determining whether at least one VoLTE property of the station satisfies a predetermined condition and causing the station to attach to the cell of the PLMN when the at least one VoLTE property satisfies the predetermined condition.

Further described is a method performed by a station connected to a Public Land Mobile Network (PLMN). The method includes identifying cells of the PLMN that are available for the station to camp on, determining whether the station is capable of executing packet switched calls, when the station is not capable of executing packet switched calls, determining whether each of the identified cells have a neighbor cell that supports circuit switched fallback (CSFB) voice calls and prioritizing the cells that are identified as having neighbor cells that support CSFB voice calls.

BRIEF DESCRIPTION OF THE DRAWINGS

FIG. 4 shows exemplary system information block data, according to various exemplary embodiments described herein.

DETAILED DESCRIPTION

Figure 1:
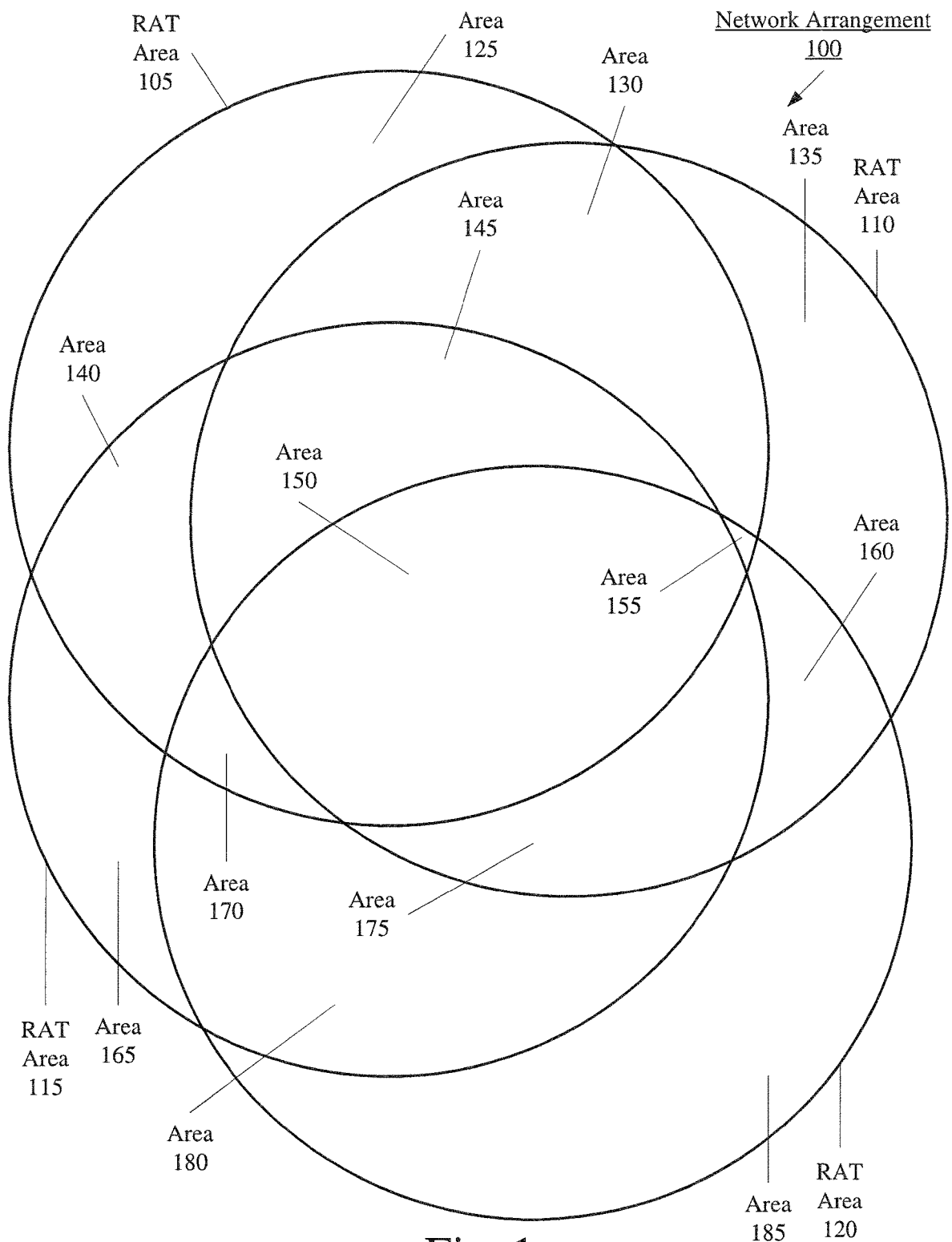
FIG. 1 shows an exemplary network arrangement including a plurality of networks using respective radio access technologies, according to various exemplary embodiments described herein.

The exemplary embodiments describe a method performed by a station, the method including determining, before attaching to a Public Land Mobile Network (PLMN), whether the PLMN is suitable for the station's cellular capabilities. The exemplary embodiments further describe a method performed by the station, the method including determining whether a legacy capable cell (e.g., a circuit switched capable cell) is available in the PLMN. The exemplary embodiments may be further understood with reference to the following description and the related appended drawings, wherein like elements are provided with the same reference numerals.

FIG. 1 shows an exemplary network arrangement 100 in which a station may be located according to various exemplary embodiments described herein. Specifically, the network arrangement 100 may relate to a particular area. For example, the network arrangement 100 may be for a portion of a global environment including different networks for the station to join. As such, the network arrangement 100 may be for a particular latitude range and longitude range. However, those skilled in the art will understand that the network arrangement 100 may be more complex to include further available networks within the latitude/longitude range. Therefore, the network arrangement 100 is shown for illustrative purposes only. It should be noted that the network arrangement 100 may also be a portion of a contiguous area. For example, the network arrangement 100 may be for a county of a state in the United States. The network arrangement 100 may have further networks that are also incorporated therein that extend beyond the boundaries shown in FIG. 1.

The network arrangement 100 of FIG. 1 shows a plurality of RAT areas 105-120. Each of the RAT areas 105-120 may represent a network in the network arrangement 100. Thus, the RAT area 105 may be a first operating area of a first network using a first RAT in a corresponding first channel; the RAT area 110 may be a second operating area of a second network using a second RAT in a corresponding second channel; the RAT area 115 may be a third operating area of a third network using a third RAT in a corresponding third channel; and the RAT area 120 may be a fourth operating area of a fourth network using a fourth RAT in a corresponding fourth channel. Those skilled in the art will understand that the RAT, channel and band are separate but related network parameters. For example, as described above, the RAT may include a plurality of channels and bands in which the RAT operates. It should again be noted that the use of four RAT areas 105-120 is only exemplary and the network arrangement 100 in the given area may include fewer or more RAT areas.

The RAT areas 105-120 may be disposed within the network arrangement 100 in such a way that the given overall area within the latitude and longitude ranges includes areas with each area including one or more of the networks. As illustrated in FIG. 1, areas 125-185 may result from the RAT areas 105-120 overlapping with one another. Specifically, the area 125 may include only the RAT of the RAT area 105; the area 130 may include the RATS of the RAT areas 105 and 110; the area 135 may include only the RAT of the RAT area 110; the area 140 may include the RATs of RAT areas 105 and 115; the area 145 may include the RATs of the RAT areas 105, 110, and 115; the area 150 may include the RATs of all the RAT areas 105-120; the area 155 may include the RATs of RAT areas 105, 110, and 120; the area 160 may include the RATs of the RAT areas 110 and 120; the area 165 may include only the RAT of the RAT area 115; the area 170 may include the RATs of the RAT areas 105, 115, and 120; the area 175 may include the RATs of the RAT areas 110-120; the area 180 may include the RATs of the RAT areas 115 and 120; and the area 185 may include only the RAT of the RAT area 120.

It should be noted that each RAT area 105-120 may include one or more base stations for the station to associate therewith to join the corresponding network. Accordingly, the station may be configured to communicate with respective base stations in the RAT areas 105-120. For example, the RAT area 105 may only have a single base station with which the station is capable of communicating. In another example, the RAT area 110 may have more than three base stations with which the station is capable of communicating. Each base station may have a respective operating area such that the combination of the respective operating areas provides the RAT area.

There are multiple RATs that include a variety of different technologies. For example, the RAT may be for a Global System for Mobile Communications (GSM) network, a Universal Mobile Telecommunications System (UMTS), a Time Division Synchronous (TD-S) Code Division Multiple Access (CDMA) (TD-SCDMA) network, a Long Term Evolution (LTE) network, a CDMA network, a Data Only (DO) network, etc. Within each type of RAT, there may be a plurality of bands that are supported by the network. For example, in the GSM network, four bands may be supported; in the Wideband CDMA (WCDMA) network, five bands may be supported; in the LTE network, over ten bands may be supported; etc. When the station is in a given location in which different networks use a respective RAT operating on a respective channel, the station may identify these networks from performing a search or a scan on the channel/frequency. For example, a ping request may be broadcast on each channel and a ping response may be transmitted from the network. The station may also become aware of the RAT that is being utilized to determine whether the station is capable of joining the network (if the RAT is supported by the station).

Each network operating in the different locations may be a Public Land Mobile Network (PLMN). The PLMN is a regulatory term used in telecommunications representing a network established and operated by an administration or by a recognized operating agency for the specific purpose of providing land mobile telecommunications services to the public. As discussed above, the PLMN may include an operating area operating on a predetermined channel and utilizing a predetermined RAT (and/or band and/or channel). Once the station has identified the available networks in the location that the station is disposed, the station may join a network in the given area by using a PLMN selection process. For example, among the available PLMNs, a priority determination may be performed for the PLMN selection process.

A VoLTE call relates to delivering of voice services as data flows over an LTE network (e.g., an LTE capable RAT). The VoLTE call may be performed as a substantially all-Internet Protocol (IP) based network standard without requiring the dedicated communications channel used in the legacy networks (e.g., 3G network). Therefore, the information used in the initial setup procedure and all voice information used during the VoLTE call is transmitted as data packets over the LTE network.

The VoLTE call may use an IP Multimedia Subsystem (IMS) that is associated with the cellular core network of the provider of the LTE network. The IMS allows for multimedia access using a common IP interface. Using the IMS, connections may be made over different protocols. Specifically, with the IMS, a VoLTE call is able to inter-operate with circuit switched voice networks. For example, if the station is connected to the LTE network and initiated a call to a receiving station that is connected to the legacy network, the IMS is used to interconnect the calls between the different networks. The IP interface of IMS may also allow the VoLTE call to inter-operate with other voice networking technologies even when circuit switched networks are not available.

Figure 2:
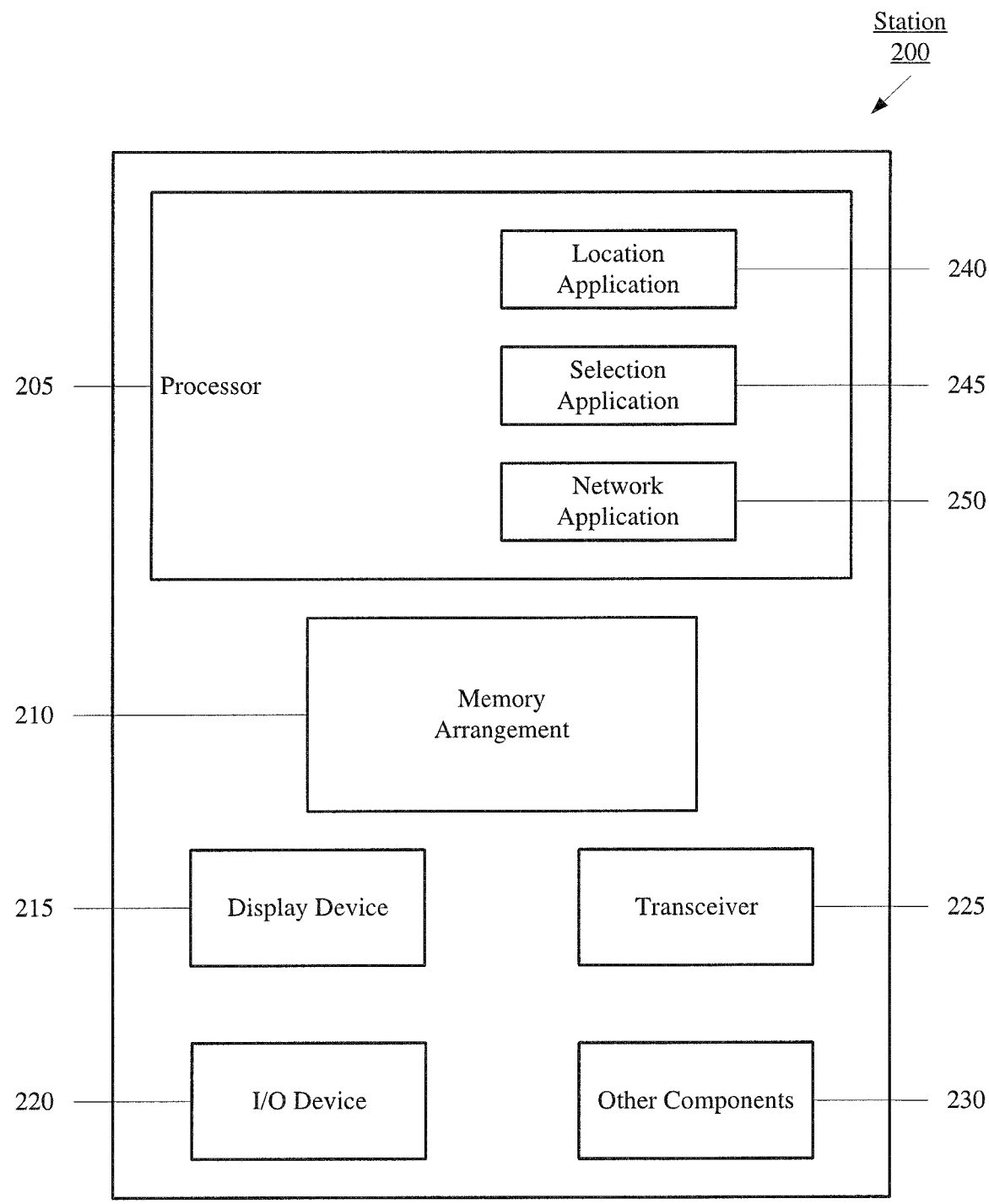
FIG. 2 shows the exemplary station configured to perform a network and a base station selection, according to various exemplary embodiments described herein.

FIG. 2 shows an exemplary station 200 configured to perform a PLMN selection process according to various exemplary embodiments described herein. The station 200 may be any electronic component configured to join a network. For example, the station 200 may be a portable device such as a cellular phone, a smartphone, a tablet, a phablet, a laptop, a wearable, etc. Accordingly, the station 200 may be configured to support one or more different network technologies that may correspond to the different RATs used in the network arrangement 100 or otherwise used by a network. The station 200 may include a processor 205, a memory arrangement 210, a display device 215, an input/output (I/O) device 220, a transceiver 225, and other components 230 such as a portable power supply, an audio (I/O) device, etc.

The processor 205 may be configured to execute a plurality of applications of the station 200. According to the exemplary embodiments, the applications may include a location application 240, a selection application 245, and a network application 250. The location application 240 may be used to determine the location in which the station 200 is disposed. The network application 250 may be used to attach to a PLMN from a selection determined by the selection application 245. The selection application 245 may perform targeted monitoring to identify the available PLMNs and provide the PLMN selection to the network application 250 based upon the location determined by the location application 240.

It should be noted that the processor 205 may include an applications processor and/or a baseband processor and the different applications described herein may be executed on either type of processor as software or firmware. It should also be noted that the location application 240, the selection application 245, and/or the network application 250 being applications (e.g., a program) executed by the processor 205 is only exemplary. The functionality of these applications 240-250 may also be represented as a separate incorporated component of the station 200 or may be a modular component coupled to the station 200. In addition, it is noted that the location application 240, the selection application 245, and the network application 250 being three separate applications is only exemplary and the functionalities associated with each of these applications may be implemented in any number of applications.

The memory arrangement 210 may be a hardware component configured to store data related to operations performed by the station 200. The display device 215 may be a hardware component configured to show data to a user while I/O device 220 may be a hardware component configured to receive inputs from the user and output corresponding data. The other components 230 may include a portable power supply (e.g., battery), a data acquisition device, ports to electrically connect the station 200 to other electronic devices, etc.

The transceiver 225 may be a hardware component configured to transmit and/or receive data. That is, the transceiver 225 may enable communication with other electronic devices. Specifically, the transceiver 225 may be used by the location application 240 to determine the location of the station 200, used by the selection application 245 to identify suited PLMNs at the location of the station 200, and used by the network application 250 to join the selected PLMN. The transceiver 225 may be used to operate on a variety of different frequencies or channels (e.g., set of consecutive frequencies) that are related to the RATS in the network arrangement 100.

According to the exemplary embodiments, the selection application 245 may perform a PLMN selection process to determine the PLMN that the station 200 is to join based upon the cellular capabilities of the station 200. The selection application 245 may also initially perform a scan to determine the available PLMNs based upon the location of the station. In this manner, the selection application 245 configures the station 200 to perform a targeted scan in known channels corresponding to known networks existing at the location at which the station 200 is disposed.

Figure 3:
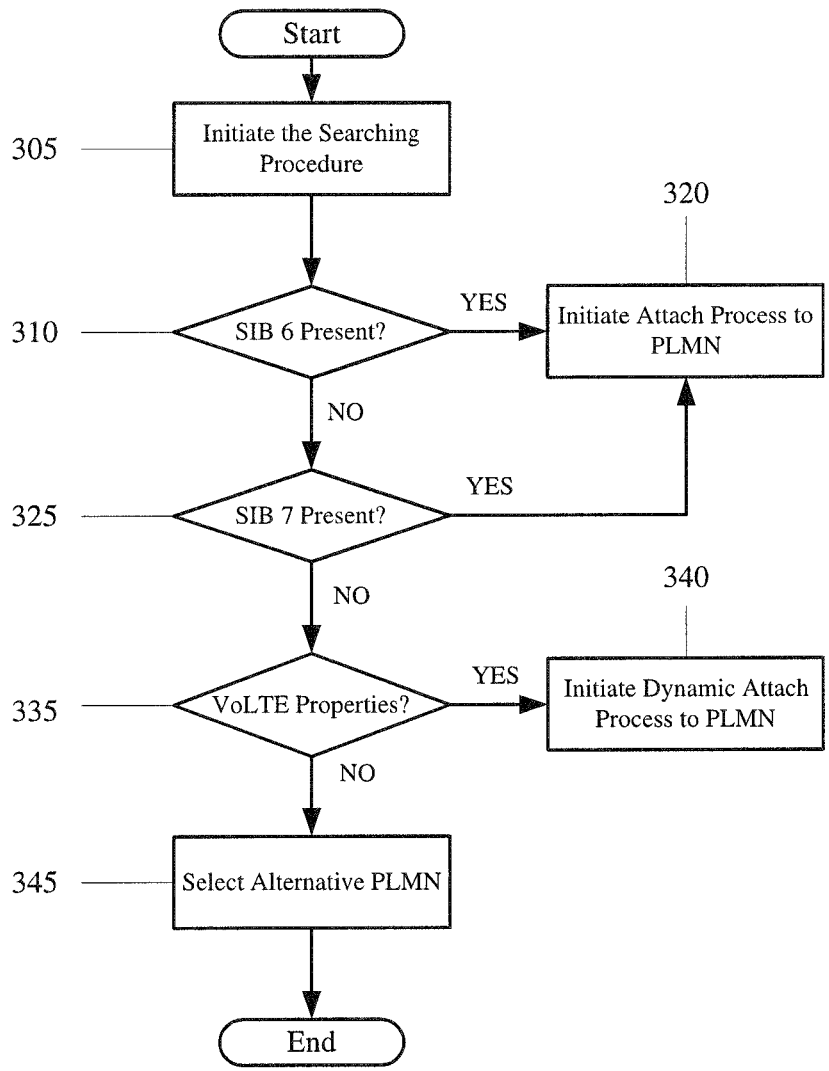
FIG. 3 shows an exemplary method for performing a PLMN selection by the station, according to various exemplary embodiments described herein.

FIG. 3 shows an exemplary method 300 for performing the PLMN selection by the station 200 according to various exemplary embodiments described herein. In particular, the exemplary method 300 may determine, before attaching to a PLMN, whether the PLMN is suitable for the station's 200 cellular technologies. In 305, the station 200 may initiate a searching procedure, via the location application 240, for a PLMN. The searching procedure may be initiated in response to the station booting up (e.g., the user turning the station on), an airplane mode setting being turned off, a VoLTE setting in the station 200 being turned on/off, leaving the boundaries of a previously attached to PLMN, etc. For example, 305 may be initiated upon the user disembarking from an aircraft and turning off the airplane mode setting.

During the searching procedure, the station 200 may receive data regarding the PLMN from one or more cells, such as an eNodeB. It is noted that in this procedure, it is assumed the cell is an LTE cell, but those skilled in the art will understand that the functionalities described herein may be applied to different types of networks. The PLMN may be a home PLMN (HPLMN), a visited PLMN (VPLMN), an equivalent home PLMN (EHPLMN), a non-equivalent home PLMN (non-EHPLMN) or any other type of PLMN. For example, returning to the user disembarking from an aircraft scenario, the station 200 may receive system information blocks (SIBs) (e.g., SIB 1 through SIB N) from the cell. An example of the SIB data may be seen in FIG. 4. Those skilled in the art would understand that any number of the SIBs may be present in the received data. However, as can be seen from the example of FIG. 4, SIB 1 includes information related to the scheduling of other SIBS. Thus, since SIB 1 includes this scheduling information, the decoding of SIB 1 will allow the station 200 to understand what additional SIBS will be received. For example, if the scheduling information of SIB 1 does not include any scheduled transmission for SIB 6 (information for re-selection to INTER-RAT (UTRAN cells)), the station 200 may determine that SIB 6 will not be received because the current cell may not have the ability to re-select to a UTRAN cell. The use of this SIB 1 scheduling information will be discussed in greater detail below.

In 310, the selection application 245 may determine whether SIB 6 will be present in the received data. As described above, determining whether SIB 6 will be present may be based on the scheduling information included in SIB 1. As described above and as shown in FIG. 4, SIB 6, in this exemplary embodiment, may provide information for re-selection to INTER-RAT UTRAN cells (e.g., 3G cells). The presence of SIB 6 indicates that the current cell has the ability to re-select to a UTRAN cell. This means that if the station 200 were to attach to this cell of the PLMN, this would provide a strong indication that the station 200 would have the ability to make a circuit switched call (e.g., a circuit switched fallback (CSFB) call) via an available UTRAN Cell.

If the SIB 6 is present, the network application 250 may initiate an attach process 320 to the cell of the PLMN. That is, since the SIB 6 is present, the station 200 will have the ability to fallback to circuit switched calls when attached to this cell. Thus, the station 200, regardless of its capabilities, will be able to conduct voice communications after connecting to the cell. Therefore, the station 200 may attempt to attach to this cell of the PLMN without the danger that the attach will fail because the cell does not support circuit switched fallback voice calls.

It should be noted that this does not require the station to attach to this cell, but merely that this cell remains an attach candidate.

If SIB 6 is not present, the method continues to 325 where the selection application 245 may determine whether SIB 7 is present in the received data. SIB 7, in this exemplary embodiment, may provide information for re-selection to INTER-RAT GERAN cells (e.g., 3G cells). If the SIB 7 is present, the network application 250 may initiate the attach process 320 to the cell of the PLMN. Again, similar to SIB 6, the presence of SIB 7 indicates that the station 200 will have the ability to perform circuit switched voice calls if needed. Thus, the station 200 may attach to this cell.

The lack of the SIB 6 and the SIB 7 may indicate that the PLMN is an LTE only network, e.g., there is no circuit switched fallback voice call capability. It should be noted that those skilled in the art would understand that the lack of additional SIBs, such as SIB 8, which provides information for re-selection to INTER-RAT CDMA2000 cells (e.g., 3G cells), may also be necessary to indicate that the PLMN is an LTE only network. Thus, there may be additional operations in the method 300 that corresponds to 310 and 325 for SIB 6 and SIB 7, respectively, for any additional SIB that may be used to determine if the PLMN is an LTE only network.

If SIB 7 is not present, the method continues to 335, where the selection application 245 may determine VoLTE properties of the station 200 to determine whether the station 200 may execute voice calls over an LTE only network (e.g., VoLTE calls). In a first exemplary embodiment, the VoLTE properties may include determining whether the station 200 is VoLTE capable. Specifically, the station 200 being VoLTE capable may depend on a model of the station 200 or the configuration of the station 200. For example, as discussed above, older generation cellular phones may lack VoLTE capabilities and cannot operate (or cannot perform voice calls) in LTE only RAT areas. As such, the selection application 245 may determine whether the configuration of the station 200 is capable of supporting VoLTE calls.

In a second exemplary embodiment, the VoLTE properties may include determining whether the station 200 is VoLTE enabled or whether the VoLTE is available at an application or core telephony layer of the station 200. For example, the user of station 200 may elect to turn the VoLTE capabilities of station 200 on or off. As such, the selection application 245 may determine whether the VoLTE capabilities of station 200 have been enabled or disabled by the user.

In a third exemplary embodiment, the VoLTE properties may include determining whether a carrier configuration profile of the station 200 is VoLTE enabled. The carrier configuration profile of the station 200 may provide methods to organize customizations related to service carriers. For example, the carrier configuration profile may include voice mail numbers, access point network (APN) settings, multimedia messaging service (MMS) settings, etc. As such, the selection application 245 may determine whether the settings in the carrier configuration profile allow for VoLTE calls.

In a fourth exemplary embodiment, the VoLTE properties may include determining whether the station 200 is VoLTE entitled. For example, when the station is roaming away from its HPLMN to a partner roaming network, the station 200 may be VoLTE enabled, but the partner agreements between the PLMNs may prohibit a roaming station from using VoLTE services. Such roaming agreement information may be stored in the station 200. Thus, when the station 200 is determining whether to roam to a network of a partner PLMN, the station 200 may know whether the station 200 is entitled to use VoLTE services of this partner PLMN.

If the VoLTE properties of the station 200 satisfy predetermined requirements, the station 200 may proceed to 340. A person skilled in the art would understand that any one or combination of VoLTE properties may need to be satisfied to proceed to 340. As discussed above, the predetermined requirements being satisfied may indicate that the station 200 may execute VoLTE calls over the PLMN. Thus, in 340, the network application 250 may attach to the PLMN. For example, the network application 250 may dynamically select an IMS APN as the attach PLMN. That is, the station 200 may dynamically perform an LTE attach using the IMS APN as opposed to a configured or blank attach APN. This may ensure that after the LTE attach procedure, the base station 200 may perform an IMS registration immediately and may further bring up IMS voice services. The LTE attach procedure may allow the station 200 to save time needed for a subsequent IMS PDN bring up and allow for the voice services to be enabled faster.

If the VoLTE properties do not satisfy the predetermined requirements, the station 200 may proceed to 345. In 345, the network application 250 may attempt to select an alternative PLMN. Since the station 200 may lack VoLTE capabilities, the selection of an alternative PLMN may be to provide the station 200 with telephony capabilities. The selection of the alternative PLMN may include utilizing the method 300 upon, scanning for the alternative PLMN.

As part of 345, the station 200 may record the current PLMN and the corresponding information about the current PLMN (e.g., cell ID, location, etc.) when the station 200 determines that an alternative PLMN should be selected. The recording of the information concerning the current PLMN may then be used in various manners by the station 200. In a first exemplary embodiment, the current PLMN may be de-prioritized by the station 200 when future searches are performed based on the stored information. For example, when the station 200 is to perform a search, the station 200 may consult an internal database or other storage mechanism that records the PLMNs (and their corresponding information) that have been de-prioritized. Searching for cells of these de-prioritized PLMNs may then occur after searching for cells of PLMNs that have not been de-prioritized. In another exemplary embodiment, the current PLMN may be blacklisted. Thus, instead of being de-prioritized, when the station 200 performs a subsequent search, the station 200 may completely skip searching for cells in the current PLMN.

As noted above, the method 300 may be performed when the cell is an LTE cell, to determine if the PLMN is an LTE only network. However, it should be noted that the exemplary embodiments are not limited to LTE scenarios. For example, it is anticipated that 5G (and later) networks may utilize packet switched voice calls schemes similar to the VoLTE scheme of LTE. Thus, the other networks that utilize packet switched voice communications (including WiFi networks) may use the functionalities described by the exemplary embodiments.

The method 300, as discussed above, may conserve the station's 200 battery supply, the PLMN's resources, and the station 200 user's time. This is because, under the current standards, the station 200 may attach to a PLMN, determine that the PLMN is not suitable for the station 200, detach from the PLMN, and continue this process until a suitable PLMN is located, all the while the station 200 would receive data and tie up resources from the multiple PLMNs. The method 300 prevents this by determining a suitable PLMN prior to attaching to it.

It should be noted that there may be situations where the station 200 may be attached to an LTE network, despite not having VoLTE capabilities. For example, the only PLMN available is an LTE network while the station 200 has disabled the VoLTE capabilities. That is, in 345 of method 300, there are no alternative PLMNs. In such a scenario, the station 200 may not be able to execute voice calls as VoLTE calls and would need to fallback to a circuit switched domain (e.g., 2G or 3G). If a LTE only cell on which the station 200 camps on does not have any circuit switched neighbor cells, the user of the station 200 may be deprived of voice call functionalities when VoLTE capabilities for the station 200 are unavailable or turned off.

Figure 5:
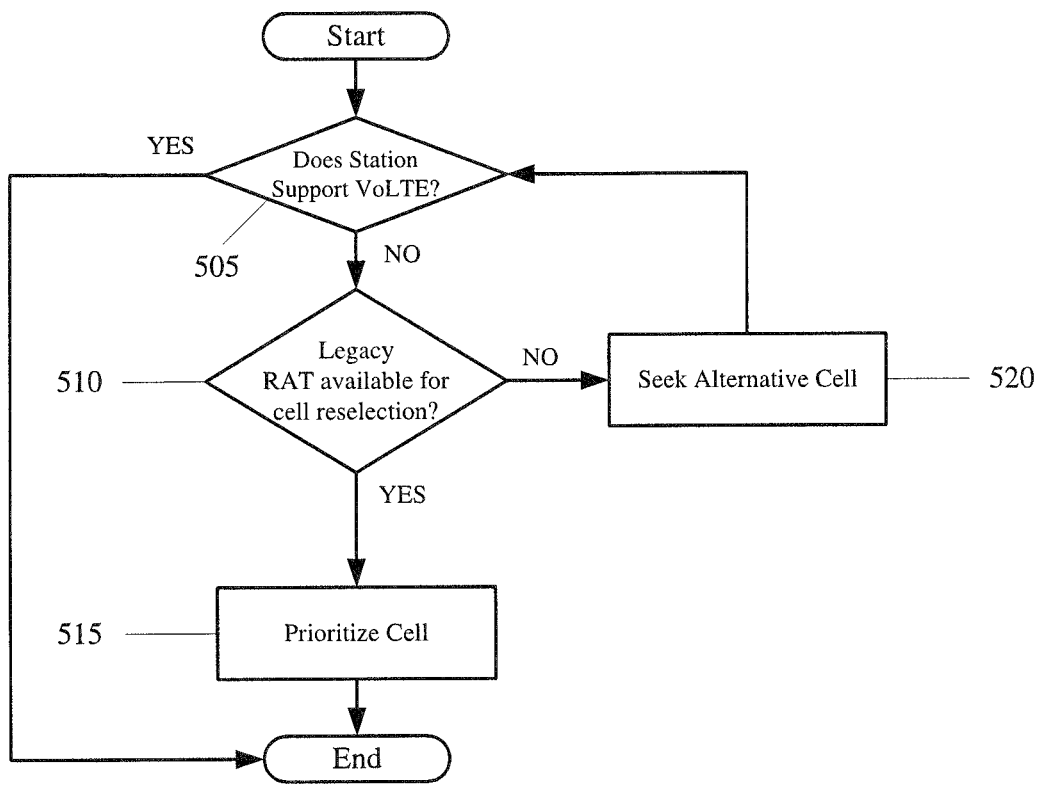
FIG. 5 shows an exemplary method for performing a selection of a legacy capable cell, according to various exemplary embodiments described herein.

In such scenarios, it may still be possible to intelligently select a cell within the camped LTE network to prioritize those cells that have 2G/3G neighbors. Since a PLMN may have multiple cells in a RAT area, as shown in FIG. 1, FIG. 5 shows an exemplary method 500 for performing a cell selection by the station 200 according to various exemplary embodiments described herein. Specifically, once the station 200 is attached to the LTE network of the PLMN, the station 200 may intelligently select a cell to camp on such that circuit switched fallback calls are possible. Thus, it may be considered that method 300 is performed prior to camping on a PLMN, whereas method 500 may be performed after camping on the PLMN.

In 505, the selection application 245 may determine whether the VoLTE properties of the station 200 enable the station 200 to execute voice calls over an LTE network (e.g., VoLTE calls). The determining the VoLTE properties may be similar to those described above with respect to 335 of the method 300. In an alternate exemplary embodiment, the VoLTE properties may have been already determined during the PLMN selection by the station 200. If the VoLTE properties of the station 200 do not allow for VoLTE calls, the station may proceed to 510.

In 510, the station 200 determines whether an LTE cell has neighbor cells associated with legacy RATs, e.g., are there legacy RAT cells available for cell reselection. In an exemplary embodiment, the station 200 receives the SIB data from the cell. Once received, the selection application 245 may determine whether SIB 6, SIB 7 and/or SIB 8 are present in the received data. As discussed above, SIB 6 may provide information for re-selection to INTER-RAT UTRAN cells (e.g., 3G cells) and SIB 7 may provide information for re-selection to INTER-RAT GERAN cells (e.g., 3G cells). SIB 8 may provide information for re-selection to INTER-RAT CDMA2000 cells (e.g., 3G cells).

If the selection application 245 determines that the SIB 6, SIB 7 and/or SIB 8 is present in the received data, in 515, the network application 250 may prioritize this LTE cell because CSFB voice calls are possible. Prioritization, for example, may entail selecting the LTE cell and placing the LTE cell on a prioritization list that may be stored in the memory 210. Additional LTE cells may already be prioritized on the prioritization list or added to the prioritization list. The LTE cells on the prioritization list may be ordered by a metric. The metric may, for example, indicate which of the LTE cells on the prioritization list have the most suitable properties for being camped on (e.g., quality of service, transmit power, data throughput, etc.) If the selection application 245 determines that the SIB 6, SIB 7 and/or SIB 8 is not present in the received data, the station 200 may move to 520 and seek an alternative cell that is neighbored to legacy RATS. The seeking process may employ method 500 once an alternative cell is located.

It should be noted that if there are no LTE cells that have neighbor cells associated with legacy RATS, the station 200 may camp on any of the LTE cells. However, voice services may be impaired. As such, the station 200 may periodically continue to search for an alternate cell and employ method 500 when any new cell is located.

It should be noted that in the above examples, the various capabilities of the cell were determined or inferred based on the reception or non-reception of various SIBs. It should be understood that there may be other manners of determining the capabilities of the various cells based on other factors besides receiving of SIBs.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform and MAC OS X, mobile platforms having operating systems such as iOS. Android, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method comprising:
    at a station:
        receiving information from a cell of a Public Land Mobile Network (PLMN);
        identifying that-the information indicates circuit switched fallback (CSFB) voice calls are not supported by the PLMN;
        determining whether at least one packet switched voice property of the station satisfies a predetermined condition, wherein a roaming agreement and partner agreements for the PLMN are stored at the station, wherein the partner agreements prohibit a roaming station from using VoLTE services;
        when the at least one packet switched voice property satisfies the predetermined condition, selecting the PLMN based on identifying that CSFB voice calls are not supported by the PLMN; and
        attaching to the cell of the PLMN based on selecting the PLMN.

2. The method of claim 1, wherein the information is received in a System Information Block (SIB) transmitted by the cell, wherein the SIB is one of SIB 1, SIB 6, SIB 7 or SIB 8.

3. The method of claim 1, further comprising:
    searching for an alternative PLMN when the at least one packet switched voice property fails to satisfy the predetermined condition.

4. The method of claim 3, further comprising:
    de-prioritizing the PLMN when the at least one packet switched voice property fails to satisfy the predetermined condition such that when the station performs a subsequent PLMN search, the PLMN will not be searched until after other non-deprioritized PLMNs are searched.

5. The method of claim 1, wherein the at least one packet switched voice property comprises whether the station is packet switched voice capable.

6. The method of claim 1, wherein the at least one packet switched voice property comprises whether the station is packet switched voice enabled.

7. The method of claim 1, wherein the at least one packet switched voice property comprises whether a carrier configuration profile of the station is packet switched voice enabled.

8. The method of claim 1, wherein the at least one packet switched voice property comprises whether the PLMN is a roaming network and the roaming agreement allows for packet switched voice calls on the roaming network.

9. The method of claim 1, wherein the at least one packet switched voice property is a VoLTE property.

10. The method of claim 1, wherein the method is initiated by one of the station booting up, an airplane mode setting of the station being turned off, a packet switched voice setting in the station being toggled, or the station leaving boundaries of a previously attached to PLMN.

11. The method of claim 1, further comprising:
determining whether CSFB voice calls are supported by a first type of radio access network; and
only when it is determined that CSFB voice calls are not supported by the first type of radio access network, determining whether CSFB voice calls are supported by a second type of radio access network.

12. The method of claim 1, wherein the at least one packet switched voice property comprises one of whether the station is packet switched voice capable, whether the station is packet switched voice enabled, whether a carrier configuration profile of the station is packet switched voice enabled, or whether the PLMN is a roaming network and the roaming agreement allows for packet switched voice calls on the roaming network.

13. A station, comprising:
a transceiver; and
a processor configured to execute instructions, wherein the instructions cause the processor to perform operations comprising:
receiving information from a cell of a Public Land Mobile Network (PLMN);
identifying that the information indicates circuit switched fallback (CSFB) voice calls are not supported by the PLMN;
determining whether at least one VoLTE property of the station satisfies a predetermined condition, wherein a roaming agreement and partner agreements of the PLMN are stored at the station, wherein the partner agreements prohibit a roaming station from using VoLTE services; and
when the at least one VoLTE property satisfies the predetermined condition, selecting the PLMN based on identifying that CSFB voice calls are not supported by the PLMN; and
causing the station to attach to the cell of the PLMN based on selecting the PLMN.

14. The station of claim 13, wherein the information is received in a System Information Block (SIB) transmitted by the cell, wherein the SIB is one of SIB 1, SIB 6, SIB 7 or SIB 8.

15. The station of claim 13, wherein the operations further comprise:
searching for an alternative PLMN when the at least one packet switched voice property fails to satisfy the predetermined condition; and
de-prioritizing the PLMN when the at least one packet switched voice property fails to satisfy the predetermined condition such that when the station performs a subsequent PLMN search, the PLMN will not be searched until after other non-deprioritized PLMNs are searched.

16. A method comprising:
at a station connected to a Public Land Mobile Network (PLMN):
identifying a plurality of cells of the PLMN that are available for the station to camp on;
determining whether the station is capable of executing packet switched calls;
when the station is not capable of executing packet switched calls, determining whether each of the plurality of cells of the PLMN have a neighbor cell that supports circuit switched fallback (CSFB) voice calls;
when at least one of the plurality of cells of the PLMN are determined to have the neighbor cell that supports CSFB voice calls, prioritizing the at least one of the plurality of cells of the PLMN; and
when no cells of the plurality of cells of the PLMN are determined to have the neighbor cell that supports CSFB voice calls, performing or re-performing a different method of intelligent cell selection depending on whether a new cell is identified by the station prior to or after camping on the PLMN.

17. The method of claim 16, wherein the determining whether each of the plurality of cells of the PLMN have the neighbor cell that supports circuit switched fallback (CSFB) voice calls is based on System Information Blocks (SIBs) received from each of the identified plurality of cells of the PLMN.

18. The method of claim 16, when at least one of the plurality of cells of the PLMN are determined to have the neighbor cell that supports CSFB voice calls, any of the plurality of cells of the PLMN that are determined not to have the neighbor cell that supports CSFB voice calls are not available for camping.

19. The method of claim 16, wherein the at least one of the plurality of cells of the PLMN are further prioritized based on at least one of a quality of service metric, a transmit power metric and a data throughput metric.

20. The method of claim 16, further comprising:
when no cells of the plurality of cells of the PLMN are determined to have the neighbor cell that supports CSFB voice calls, camping on one of the plurality of cells of the PLMN; and
when a new cell of the PLMN is identified by the station, re-performing the method.

* * * * *